(12) United States Patent
Liu et al.

(10) Patent No.: US 9,244,579 B2
(45) Date of Patent: Jan. 26, 2016

(54) TOUCH DISPLAY APPARATUS AND TOUCH MODE SWITCHING METHOD THEREOF

(71) Applicant: HIMAX TECHNOLOGIES LIMITED, Tainan (TW)

(72) Inventors: Li-Lin Liu, Tainan (TW); Shen-Feng Tai, Tainan (TW); Chung-Wen Chang, Tainan (TW); Jui-Min Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 14/133,287

(22) Filed: Dec. 18, 2013

(65) Prior Publication Data

US 2015/0169102 A1      Jun. 18, 2015

(51) Int. Cl.
    *G06F 3/044*      (2006.01)
    *G06F 3/041*      (2006.01)
    *G06F 3/0354*     (2013.01)

(52) U.S. Cl.
    CPC ............. *G06F 3/044* (2013.01); *G06F 3/03545* (2013.01); *G06F 3/041* (2013.01); *G06F 3/0416* (2013.01); *G06F 2203/04106* (2013.01)

(58) Field of Classification Search
    CPC ....... G06F 3/044; G06F 3/041; G06F 3/0416; G06F 3/03545; G06F 2203/04106
    USPC .......................................... 345/173; 178/18.06
    See application file for complete search history.

(56) References Cited

U.S. PATENT DOCUMENTS

| | | | | |
|---|---|---|---|---|
| 2006/0012580 | A1* | 1/2006 | Perski ..................... | G06F 3/038 345/173 |
| 2007/0242056 | A1* | 10/2007 | Engelhardt ........... | G06F 3/0416 345/173 |
| 2010/0006350 | A1* | 1/2010 | Elias ......................... | 178/18.06 |
| 2012/0293453 | A1* | 11/2012 | Yamada ................ | G06F 3/0416 345/174 |
| 2013/0285974 | A1* | 10/2013 | Nakabayashi ........ | G06F 3/0416 345/174 |
| 2013/0335358 | A1* | 12/2013 | Bowens ........................ | 345/173 |
| 2014/0098038 | A1* | 4/2014 | Paek et al. ..................... | 345/173 |
| 2014/0111472 | A1* | 4/2014 | Lee .......................... | G06F 3/041 345/174 |
| 2014/0210780 | A1* | 7/2014 | Lee ...................... | G06F 3/03545 345/174 |
| 2014/0354583 | A1* | 12/2014 | Tokutake .............. | G06F 3/0488 345/174 |
| 2015/0160778 | A1* | 6/2015 | Kim ........................ | G06F 3/044 345/174 |

FOREIGN PATENT DOCUMENTS

| | | |
|---|---|---|
| TW | 200943140 | 10/2009 |
| TW | 201128478 | 8/2011 |
| TW | 201316211 | 4/2013 |
| TW | 201447655 | 12/2014 |

OTHER PUBLICATIONS

"Office Action of Taiwan Counterpart Application", issued on May 29, 2015, p. 1-p. 3.

* cited by examiner

*Primary Examiner* — Priyank Shah
(74) *Attorney, Agent, or Firm* — J.C. Patents

(57) ABSTRACT

A touch display apparatus and a touch mode switching method thereof are provided. A touch mode of a touch panel is switched according to a touch track and a touch area of an input tool.

4 Claims, 5 Drawing Sheets

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 1 | 1 | (5) | 1 | 1 | 1 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG. 2A

|   |   |   |   |   |   |   |   |   |   |   |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 2 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 2 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 3 | 0 | 0 | 0 | 0 | 0 |
| 0 | 0 | 0 | 0 | 0 | 4 | 3 | 0 | 0 | 0 | 0 |
| 0 | 0 | 0 | 0 | 0 | 3 | 0 | 0 | 0 | 0 | 0 |
| 0 | 0 | 0 | 0 | 0 | 7 | 3 | 0 | 0 | 0 | 0 |
| 0 | 1 | 2 | 4 | 15 | 98 | 56 | 5 | 2 | 1 | 0 |
| 4 | 6 | 7 | 11 | 53 | 165 | 105 | 9 | 1 | 0 | 0 |
| 0 | 0 | 0 | 2 | 10 | 34 | 16 | 2 | 2 | 1 | 1 |
| 0 | 0 | 0 | 0 | 2 | 9 | 5 | 0 | 0 | 0 | 0 |
| 0 | 0 | 0 | 0 | 2 | 8 | 3 | 0 | 0 | 0 | 0 |
| 0 | 0 | 0 | 0 | 1 | 7 | 3 | 0 | 0 | 0 | 0 |
| 0 | 0 | 0 | 0 | 0 | 5 | 1 | 0 | 0 | 0 | 0 |
| 0 | 0 | 0 | 0 | 0 | 6 | 2 | 0 | 0 | 0 | 0 |
| 0 | 0 | 0 | 0 | 0 | 5 | 2 | 0 | 0 | 0 | 0 |
| 0 | 0 | 0 | 0 | 0 | 5 | 2 | 0 | 0 | 0 | 0 |

FIG. 2B

TOUCH DISPLAY APPARATUS AND TOUCH MODE SWITCHING METHOD THEREOF

BACKGROUND OF THE INVENTION

1. Field of Invention

The invention generally relates to an electronic device, and more particularly to a touch display apparatus and a touch mode switching method thereof.

2. Description of Related Art

With the rapid development of technology, most electronic devices, such as notebook computers, mobile phones or portable multimedia players, usually adopt touch panels as input interfaces. Based on different sensing types, a touch panel can be generally categorized into a resistance touch panel, a capacitive touch panel, an optical touch panel, an acoustic-wave touch panel and an electromagnetic touch panel. The capacitive touch panel is characterized by short response speed, favorable reliability, satisfactory durability, and so on. Therefore, the capacitive touch panel is widely used in the electronic products.

The capacitive touch panel is operated by approaching or touching the touch panels with a finger or a conductive material to change the capacitances of the touch panel. When variation of the capacitance values is detected, the location approached or touched by the finger or conductive material can be identified to further execute a predetermined operation corresponding to the foregoing approached or touched location.

When using the stylus pen to perform the touching, the touch mode of the capacitive touch panel has to be switched to improve the sensitivity of the capacitive touch panel in order to judge the touch position of the stylus pen accurately. However, because the touch sensing signal intensity of the stylus pen is similar to the noise of the capacitive touch panel, it is easy to erroneously judge the noise as the touch sensing signal of the stylus pen for the capacitive touch panel. The capacitive touch panel is then switched to the high sensitivity touch mode, which increases unnecessary power consumption.

SUMMARY OF THE INVENTION

The invention provides a touch display apparatus and a touch mode switching method thereof. The invention may avoid the touch display apparatus switching the touch mode of the touch display apparatus to the high sensitivity mode erroneously, which increases the unnecessary power consumption.

The touch display apparatus of the invention comprises a touch panel and a control unit. The touch panel detects a touch track of an input tool and a touch area of the input tool. A control unit is coupled to the touch panel, switching a touch mode of the touch panel according to the touch track of the input tool and the touch area of the input tool.

In an embodiment of the invention, when the touch track is conformed with a predetermined track and the touch area is smaller than a first predetermined area, the control unit switches the touch mode of the touch panel to a first touch mode. When the touch area is larger than a second predetermined area or when a touch operation has not been detected by the touch panel for a first predetermined time, the control unit switches the touch mode of the touch panel to a second touch mode, wherein the touch sensitivity of the touch panel in the first touch mode is higher than the touch sensitivity of the touch panel in the second touch mode. The second predetermined area is larger than the first predetermined area.

In an embodiment of the invention, the predetermined track includes the track of a touch panel being clicked continuously during a second predetermined time.

In an embodiment of the invention, the control unit further judges the type of the input tool according to a touch sensing signal intensity corresponding to the input tool. When the touch track is conformed with the predetermined track, the touch area is smaller than the predetermined area, and the touch sensing signal intensity corresponding to the input tool is smaller than a predetermined intensity, the control unit switches the touch mode of the touch panel to the first touch mode.

In an embodiment of the invention, the input tool corresponding to the first touch mode is a stylus pen, and the input tool corresponding to the second touch mode is a finger of a user.

A touch mode switching method of a touch display apparatus of the invention includes following steps: detecting a touch track of an input tool and a touch area of the input tool; and switching a touch mode of the touch display apparatus according to the touch track of the input tool and the touch area of the input tool.

In an embodiment of the invention, the step of switching the touch mode of the touch display apparatus according to the touch track and the touch area includes following steps: judging whether the touch track is conformed with a predetermined track and whether the touch area is smaller than a first predetermined area; if the touch track is conformed with the predetermined track and the touch area is smaller than the first predetermined area, switching the touch mode of the touch display apparatus to a first touch mode; judging whether the touch area is larger than a second predetermined area or whether a touch operation has not been detected by the touch display apparatus for a first predetermined time; if the touch area is larger than the second predetermined area or the touch operation has not been detected by the touch display apparatus for the first predetermined time, switching the touch mode of the touch display apparatus to a second touch mode, wherein the touch sensitivity of the touch display apparatus in the first touch mode is higher than the touch sensitivity of the touch display apparatus in the second touch mode, the second predetermined area is larger than the first predetermined area.

In an embodiment of the invention, the predetermined track includes a track of the touch display apparatus being clicked continuously during a second predetermined time.

In an embodiment of the invention, the touch mode switching method further includes following steps: judging whether the touch sensing signal intensity corresponding to the input tool is smaller than a predetermined intensity; if the touch track is conformed with the predetermined track, the touch area is smaller than the predetermined area, and the touch sensing signal intensity corresponding to the input tool is smaller than a predetermined intensity, the control unit switches the touch mode of the touch display apparatus to the first touch mode.

In an embodiment of the invention, the input tool corresponding to the first touch mode is a stylus pen, the input tool corresponding to the second touch mode is a finger of a user.

Based on the above, the embodiment of the invention switches the touch mode of the touch panel according to the touch track and the touch area of the input tool to avoid a touch display apparatus switching the touch mode of the touch display apparatus to the high sensitivity mode erroneously, which increases the unnecessary power consumption.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic diagram of a plurality of counting values corresponding to the touch sensing signal of the stylus pen.

FIG. 2B is a schematic diagram of a plurality of counting values corresponding to the touch sensing signal of a finger of a user.

DESCRIPTION OF EMBODIMENTS

Figure 1:
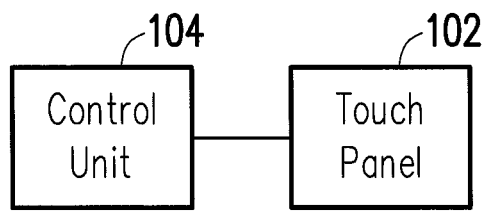
FIG. 1 is a schematic diagram of a touch display apparatus according to an embodiment of the invention.

FIG. 1 is a schematic diagram of a touch display apparatus according to an embodiment of the invention. Please refer to FIG. 1. The touch display apparatus may be an electronic device having a touch function such as a smart phone, a tablet computer, a notebook computer, for example. The touch display apparatus may include a touch panel 102 and a control unit 104. The control unit 104 is coupled to the touch panel 102. The touch panel 102 detects a touch track of an input tool and a touch area of the input tool. The control unit 104 switches a touch mode of the touch panel 102 according to the touch track of the input tool and the touch area of the input tool, such that the touch panel 102 may have different touch sensitivities corresponding to different input tools. The input tool may be a stylus pen or a finger of a user, for example, although this should not be construed as limiting the invention thereto.

To be specific, FIG. 2A is a schematic diagram of a plurality of counting values corresponding to the touch sensing signal of the stylus pen. FIG. 2B is a schematic diagram of a plurality of counting values corresponding to the touch sensing signal of a finger of a user, in which larger the counting value, the stronger the intensity of the sensing signal. Because both of the touch area and touch sensing signal intensity corresponding to the touch sensing signal of the stylus pen are smaller than the touch area and the touch sensing signal intensity corresponding to the touch sensing signal of the user's finger, the control unit 104 switches the touch mode of the touch panel 102 according to the touch track and touch area of the input tool. The control unit 104 may judge whether the touch track of the input tool is conformed with the predetermined track and whether the touch area is smaller than the first predetermined area. If the touch track is conformed with the predetermined track and the touch area is smaller than the first predetermined area, the control unit 104 may switch the touch mode of the touch panel to a first touch mode. That is, the control unit 104 may switch the touch mode of the touch panel to the high sensitivity touch mode suitable for the operation of the stylus pen.

The predetermined track may be, for example, the touch track of the touch panel 102 clicked continuously. For example, using the stylus pen to double click the touch panel 102 continuously, control unit 104 switches the touch mode of the touch panel to the first touch mode. As mentioned above, because the touch area corresponding to the touch sensing signal of the stylus pen is smaller than the touch area corresponding to the touch sensing signal of the user's finger, switching the touch mode of the touch panel 102 according to both the touch track and the touch area may ensure the input tool that performed the touch operation is the stylus pen. Moreover, the signal characteristics of the touch sensing signal generated by the continuous double clicking is different from the signal characteristics of a typical noise, so the control unit 104 can avoid erroneously switching the touch mode of the touch panel 102 into the high sensitivity mode, which increases unnecessary power consumption.

Accordingly, after the touch panel 102 is switched to the first touch mode, the control unit 104 may continue to judge whether the touch mode of the touch panel 102 should be switched again according to the touch operation situation detected by the touch panel 102. For example, the control unit 104 may judge whether the touch area of the touch panel 102 is larger than the second predetermined area (the second predetermined area is larger than the first predetermined area) or whether the touch operation has not been detected by the touch panel for a predetermined time. If the touch area of the touch panel 102 is larger than the second predetermined area or the touch operation has not been detected by the touch panel for the predetermined time, the control unit 104 switches the touch mode of the touch panel 102 to a second touch mode. That is, the control unit 104 switches the touch mode of the touch panel 102 to the high sensitivity touch mode suitable for the user's finger. The touch sensitivity of the touch panel 102 in the second touch mode is lower than the touch sensitivity of the touch panel 102 in the first touch mode, and accordingly the power consumption of the touch display apparatus can be reduced.

It should be noted that the embodiment switches the touch mode of the touch panel 102 only according to the touch track and the touch area of the input tool. But as shown in FIG. 2A and FIG. 2B, the intensity of the touch sensing signal corresponding to the stylus pen is also smaller than the touch sensing signal corresponding to the finger of the user obviously. Therefore, in other embodiments, the touch mode of the touch panel 102 may be switched according to the intensity of the touch sensing signal. That is to say, when the control unit 104 judges the touch track of the input tool conformed with the predetermined track, the touch area of the input tool being smaller than the first predetermined area, and the touch sensing signal intensity corresponding to the input tool being smaller than the predetermined intensity, the control unit 104 switches the touch mode of the touch panel 102 to the first touch mode.

Figure 3:
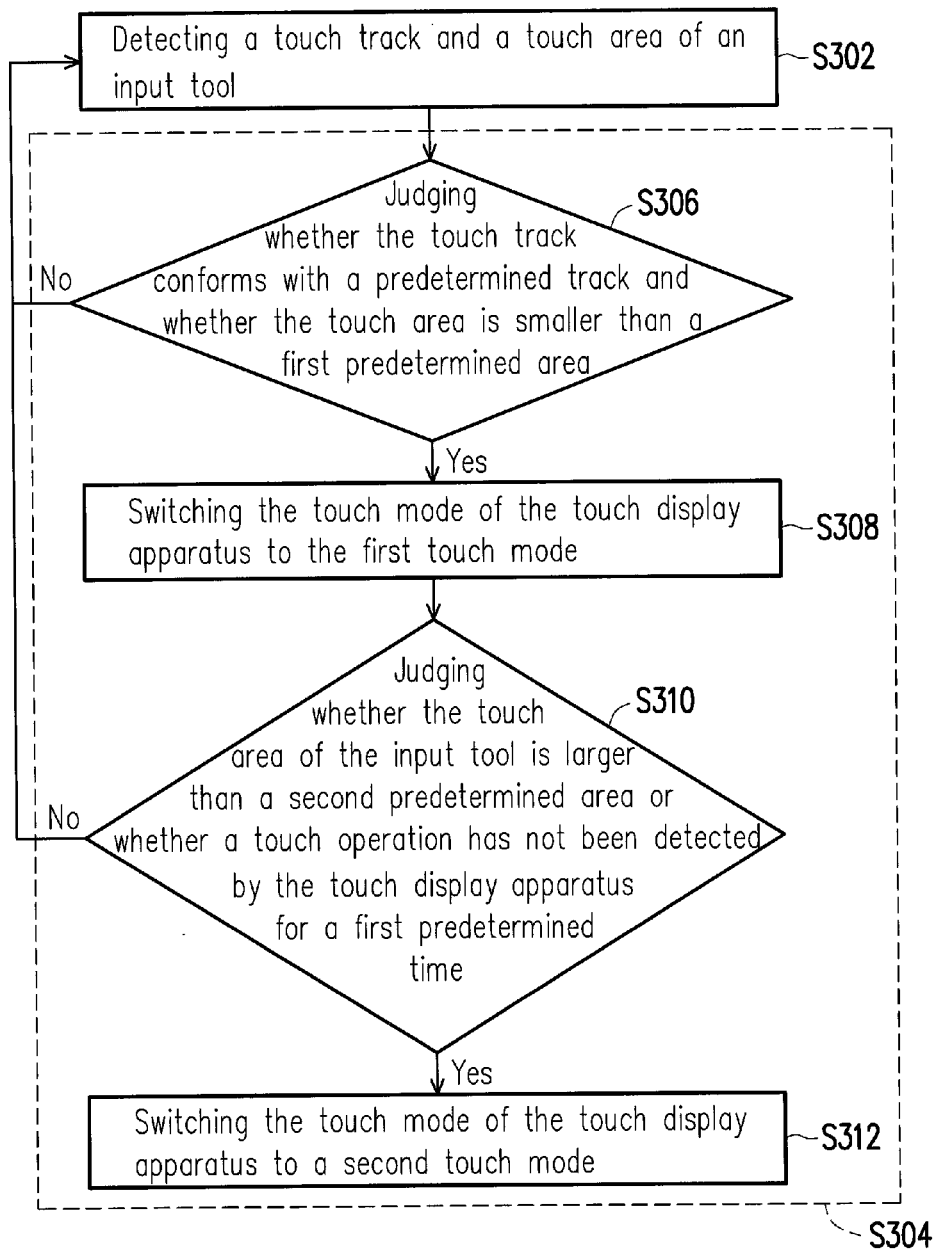
FIG. 3 is a touch mode switching method of a touch display apparatus according to an embodiment of the invention.

FIG. 3 is a touch mode switching method of a touch display apparatus according to an embodiment of the invention. Please refer to FIG. 3. The touch mode switching method of the aforementioned touch display apparatus may include following steps. First, detecting a touch track of an input tool and a touch area of the input tool (step S302). Next, switching a touch mode of the touch display apparatus according to the touch track of the input tool and the touch area of the input tool (step S304). Specifically, step S304 may include judging whether the touch track is conformed with a predetermined track and whether the touch area is smaller than a first predetermined area (step S306). The predetermined track may be, for example, the touch track of the continuous click on the touch display apparatus, such as the double clicking of the touch display apparatus during a second predetermined time, for example. If the touch track is conformed with the predetermined track and the touch area is smaller than the first predetermined area, the touch mode of the touch display apparatus is switched to the first touch mode (step S308). On the contrary, if the touch track is not conformed with the predetermined track or the touch area is not smaller than the first predetermined area, then return to the step S302 to continue detecting the touch track and the touch area of the input tool.

After step S308, whether the touch area of the input tool is larger than a second predetermined area or whether a touch operation has not been detected by the touch display apparatus for a first predetermined time is judged (step S310). If the touch area of the input tool is larger than the second predetermined area or the touch operation is not detected by the touch display apparatus for the first predetermined time, switch the touch mode of the touch display apparatus to a second touch mode (step S312), in which the touch sensitivity of the touch display apparatus in the first touch mode is higher than the touch sensitivity of the touch display apparatus in the second touch mode. Accordingly, the second predetermined area is larger than the first predetermined area. On the contrary, if the touch area of the input tool is not larger than the second predetermined area and the touch operation is detected by the touch display apparatus during the first predetermined time, return to step S302 and keep detecting the touch track and the touch area of the input tool. The input tool corresponding to the first touch mode may be, for example, a stylus pen, and the input tool corresponding to the second touch mode may be, for example, a finger of a user, although this should not be construed as limiting the invention thereto.

Figure 4:
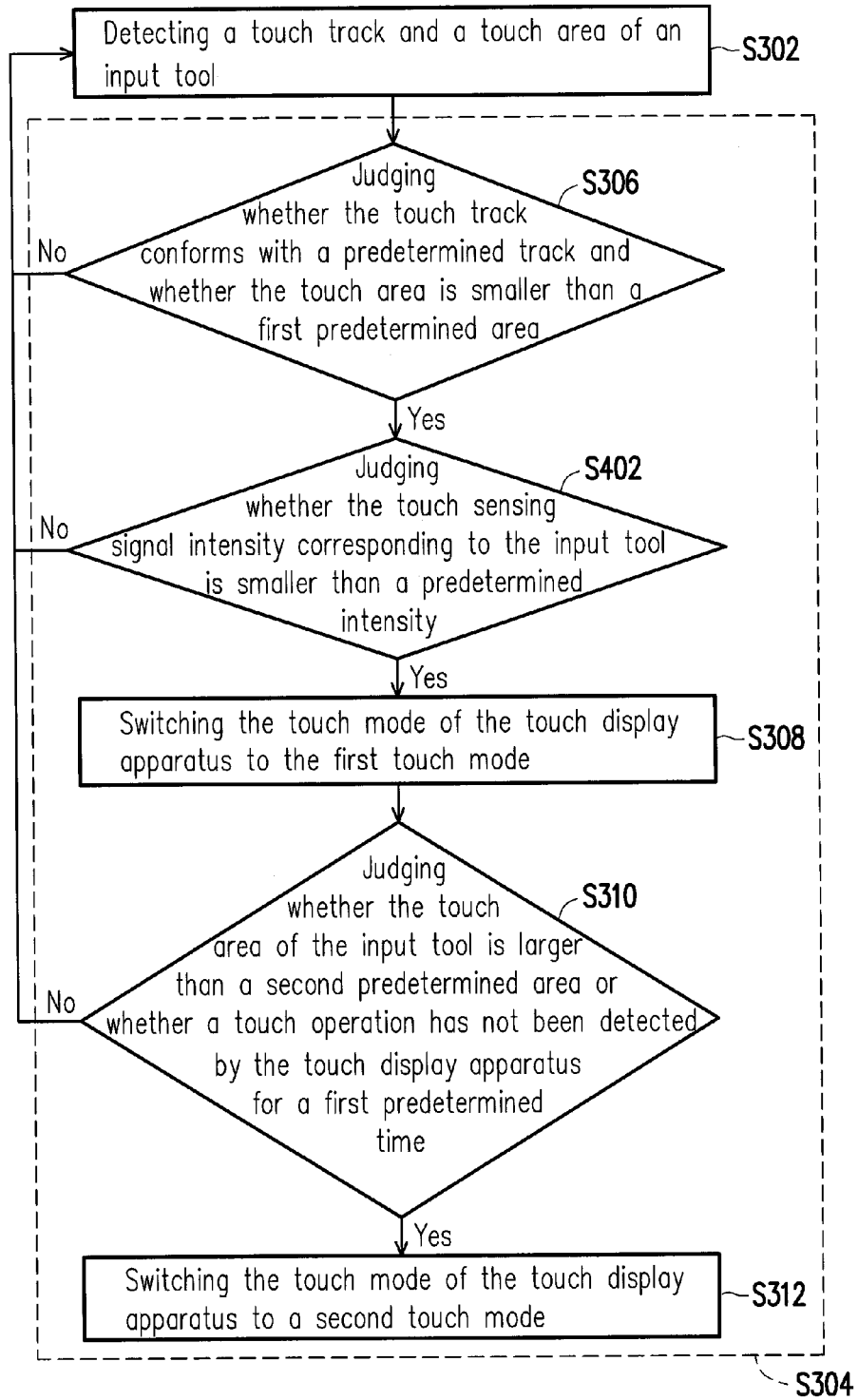
FIG. 4 is a touch mode switching method of a touch display apparatus according to another embodiment of the invention.

FIG. 4 is a touch mode switching method of a touch display apparatus according to another embodiment of the invention. Please refer to FIG. 4. The difference between the embodiment of FIG. 4 and the touch mode switching method of the embodiment of FIG. 3 is that, in the touch mode switching method of the embodiment of FIG. 4, after judging the touch track is conformed with a predetermined track and the touch area is smaller than a first predetermined area (that is, after step S306), whether the touch sensing signal intensity corresponding to the input tool is smaller than a predetermined intensity or not is further judged (step S402). If the touch sensing signal intensity corresponding to the input tool is smaller than the predetermined intensity, that is, if the touch track is conformed with the predetermined track, the touch area is smaller than the first predetermined area, and the touch sensing signal intensity corresponding to the input tool is smaller than a predetermined intensity, proceed to step S308, and the touch mode of the touch display apparatus is switched to the first touch mode. On the contrary, if the touch sensing signal intensity corresponding to the input tool is not smaller than the predetermined intensity, return to step S302 and keep detecting the touch track and the touch area of the input tool.

In view of the foregoing, embodiments of the invention switch the touch mode of the touch panel according to the touch track and the touch area of the input tool to avoid the touch display apparatus erroneously switching the touch mode of the touch display apparatus to the high sensitivity mode, which increases unnecessary power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display apparatus, comprising:
 a touch panel, detecting a touch track of an input tool and a touch area of the input tool; and
 a control unit, coupled to the touch panel, switching a touch mode of the touch panel according to the touch track of the input tool and the touch area of the input tool,
 wherein when the touch track is conformed with a predetermined track and the touch area is smaller than a first predetermined area, the control unit switches the touch mode of the touch panel to a first touch mode, when the touch area is larger than a second predetermined area or when a touch operation has not been detected by the touch panel for a first predetermined time, the control unit switches the touch mode of the touch panel to a second touch mode, wherein the predetermined track comprises a track of the touch panel being clicked repeatedly during a second predetermined time, and signal characteristics of a touch sensing signal generated by the repeative clicking is different from the signal characteristics of a typical noise,
 wherein the touch sensitivity of the touch panel in the first touch mode is higher than the touch sensitivity of the touch panel in the second touch mode, and the second predetermined area is larger than the first predetermined area, and
 wherein the input tool corresponding to the first touch mode is a stylus pen, and the input tool corresponding to the second touch mode is a finger of a user.

2. The touch display apparatus as claimed in claim 1, wherein the control unit further judges the type of the input tool according to a touch sensing signal intensity corresponding to the input tool, and when the touch track is conformed with the predetermined track, the touch area is smaller than the first predetermined area, and the touch sensing signal intensity corresponding to the input tool is smaller than a predetermined intensity, the control unit switches the touch mode of the touch panel to the first touch mode.

3. A touch mode switching method of a touch display apparatus, comprising:
 detecting a touch track of an input tool and a touch area of the input tool; and
 switching a touch mode of the touch display apparatus according to the touch track of the input tool and the touch area of the input tool, the step comprising:
 judging whether the touch track is conformed with a predetermined track and whether the touch area is smaller than a first predetermined area or not;
 if the touch track is conformed with the predetermined track and the touch area is smaller than the first predetermined area, switching the touch mode of the touch display apparatus to a first touch mode;
 judging whether the touch area is larger than a second predetermined area or whether a touch operation has not been detected by the touch display apparatus for a first predetermined time; and
 if the touch area is larger than the second predetermined area or the touch operation has not been detected by the touch display apparatus for the first predetermined time, switching the touch mode of the touch display apparatus to a second touch mode,
 wherein the predetermined track comprises a track of the touch display apparatus being clicked repeatedly during a second predetermined time, and signal characteristics of a touch sensing signal generated by the repeative clicking is different from the signal characteristics of a typical noise, wherein the touch sensitivity of the touch display apparatus in the first touch mode is higher than the touch sensitivity of the touch display apparatus in the second touch mode, and the second predetermined area is larger than the first predetermined area, and wherein the input tool corresponding to the first touch mode is a stylus pen, the input tool corresponding to the second touch mode is a finger of a user.

4. The touch mode switching method as claimed in claim 3, further comprises:

judging whether the touch sensing signal intensity corresponding to the input tool is smaller than a predetermined intensity or not; and if the touch track is conformed with the predetermined track, the touch area is smaller than the first predetermined area, and the touch sensing signal intensity corresponding to the input tool is smaller than a predetermined intensity, the control unit switches the touch mode of the touch display apparatus to the first touch mode.

* * * * *